(12) United States Patent
DeJong et al.

(10) Patent No.: US 11,928,084 B2
(45) Date of Patent: Mar. 12, 2024

(54) METADATA STORE IN MULTIPLE REUSABLE APPEND LOGS

(71) Applicant: Nebulon, Inc., Fremont, CA (US)

(72) Inventors: David DeJong, Fremont, CA (US); Siamak Nazari, Mountain View, CA (US)

(*) Notice: Subject to any disclaimer, the term of this patent is extended or adjusted under 35 U.S.C. 154(b) by 11 days.

(21) Appl. No.: 17/802,895

(22) PCT Filed: Feb. 26, 2021

(86) PCT No.: PCT/US2021/020015
§ 371 (c)(1),
(2) Date: Aug. 26, 2022

(87) PCT Pub. No.: WO2021/174074
PCT Pub. Date: Sep. 2, 2021

(65) Prior Publication Data
US 2023/0111251 A1    Apr. 13, 2023

Related U.S. Application Data

(60) Provisional application No. 62/983,280, filed on Feb. 28, 2020.

(51) Int. Cl.
*G06F 16/18* (2019.01)

(52) U.S. Cl.
CPC .................. *G06F 16/1805* (2019.01)

(58) Field of Classification Search
CPC .................................... G06F 16/1805
USPC ........................................................ 707/822
See application file for complete search history.

(56) References Cited

U.S. PATENT DOCUMENTS

| | | | |
|---|---|---|---|
| 6,405,201 B1* | 6/2002 | Nazari | G06F 16/10 |
| 9,104,688 B2 | 8/2015 | Koifman et al. | |
| 10,162,843 B1 | 12/2018 | Srivastav et al. | |
| 10,198,463 B2* | 2/2019 | Eidson | G06F 16/2282 |
| 10,540,095 B1* | 1/2020 | Cheng | G06F 16/14 |
| 11,023,318 B1* | 6/2021 | Volkov | G06F 16/1805 |
| 2003/0121372 A1 | 7/2003 | Huang | |
| 2013/0227236 A1* | 8/2013 | Flynn | G06F 12/0292 |
| | | | 711/172 |
| 2017/0046099 A1* | 2/2017 | DeJong | G06F 3/0656 |
| 2017/0272209 A1 | 9/2017 | Yanovsky et al. | |
| 2017/0357462 A1* | 12/2017 | Walker | G06F 3/0683 |
| 2019/0347339 A1* | 11/2019 | Becker | G06F 11/3476 |
| 2020/0026780 A1* | 1/2020 | Wozniak | G06F 16/1744 |

\* cited by examiner

*Primary Examiner* — Hicham Skhoun
(74) *Attorney, Agent, or Firm* — David Millers

(57) ABSTRACT

A storage system (100) stores metadata using an append log to provide speed and reliability. Appending entities to the end of a metadata store (154) and provides reliability in the event of failure because a failed append operation at worst corrupts the end of the append log, which is easily detected and corrected. A metadata store (154) can be split into sections (158). A used section (158) may be identified as garbage when the stored metadata in other sections (158) make the all of its stored entity sets stale. A used section (158) can be made garbage by storing the entity sets from the section (158) in another section (158). Sections (158) containing garbage thereby change to unused allow replacement and removal of previous sections (158) of metadata.

9 Claims, 2 Drawing Sheets

METADATA STORE IN MULTIPLE REUSABLE APPEND LOGS

BACKGROUND

Storage platforms often use complex metadata that needs to be stored in a manner that is both fast and extremely reliable. Traditional databases create too much overhead for efficient use. Some other prior metadata stores such as described in U.S. Pat. No. 10,073,649, entitled "Storing Metadata," suffered from unreliability due to complexity. Alternatively, storage systems that store metadata using simple files has problems with reliability, atomicity, and speed.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

In accordance with an aspect of the current disclosure, metadata for a storage system may be stored using an append log to provide speed and reliability. Entities representing metadata can be quickly added to the end of the append log, which provides reliability in the event of failure because a failed append operation at worst corrupts an end of the stored metadata, which may be easily detected and corrected, e.g., using error correction coding. Dedicated storage used for the metadata can include a raw partition split into sections. The sections of a metadata append log can be monitored for efficient storage and identified for refresh or garbage collection operations to ensure efficient use and availability of dedicated metadata storage, and multiple append logs, which may be in different storage devices, may provide redundancy.

Figure 1:
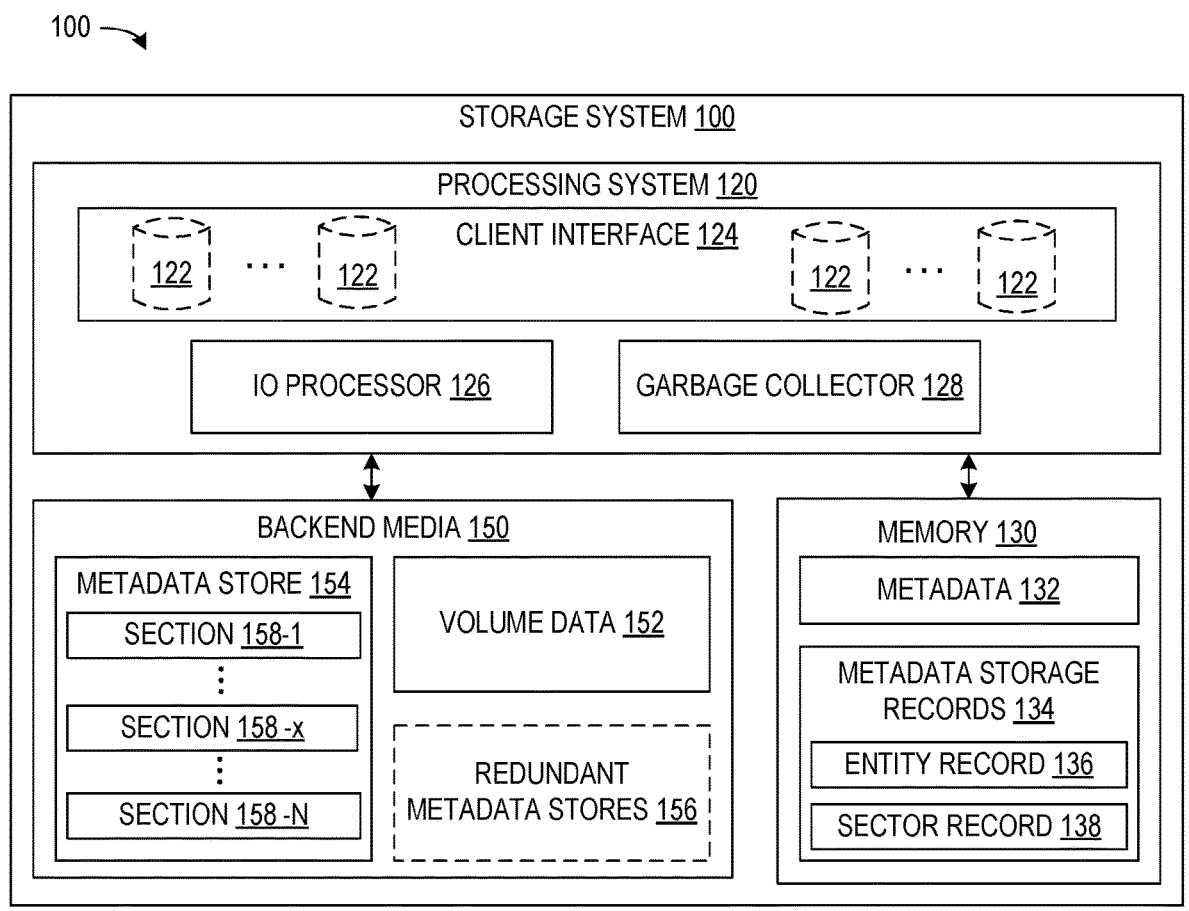
FIG. 1 is a block diagram of a storage system in accordance with an example of the present disclosure.

FIG. 1 is a block diagram illustrating a storage system 100 in one example of the present disclosure. Storage system 100 generally includes underlying storage or backend media 150. Backend storage media 150 of storage system 100 may include hard disk drives, solid state drives, or other non-volatile storage devices or media in which data may be physically stored. A processing system 120 of storage system 100 provides an interface 124 to storage clients (not shown) that exposes virtual volumes 122 to storage operations such as writing and reading of blocks of data at specified locations in specified virtual volumes 122. Virtual volumes 122 may be distinguished from each other, for example, by respective volume IDs, and each virtual volume 122 may logically include pages that may be distinguished from each other by addresses or offsets within the virtual volume 122.

Processing system 120 generally includes one or more microprocessors or microcontrollers with interface hardware for communications, e.g., with storage clients, and interface hardware for accessing backend media 150 and memory 130. Processing system 120 is particularly configured to provide the client interface 124 that exposes virtual volumes 122 for storage operations or IO request, e.g., from the storage clients (not shown). In addition to the interface 124 exposing virtual volumes 122 to storage clients, processing system 120 may implement an input/output (I/O) processor 126 and a garbage collector 128. I/O processor 126 and garbage collector 128 may, for example, be implemented as separate modules employing separate hardware in processing system 120 or may be software or firmware modules that are executed by the same microprocessor or different microprocessors in processing system 120.

I/O processor 126 is configured to perform data operations such as storing and retrieving data corresponding to virtual volumes 122 in backend media 150 as volume data 152. Garbage collector 128 detects and releases storage of volume data 152 that was allocated to store data for volumes 122 but that now stores data that is no longer needed. In particular, old data corresponding to pages in virtual volumes 122 may be overwritten with new data, and garbage collector 128 may determine whether overwritten data is still need and may free storage space corresponding to the old data if the old data is no longer needed. Additionally, garbage collector 128 may monitor the use of sections 158-1 to 158-N in a dedicated metadata store 154 and any redundant metadata store 156 in backend media 150.

Processing system 120 employs memory 130, which may include volatile and non-volatile RAM. (The non-volatile portion of memory 130 is sometimes referred to herein as persistent memory.) In general, processing system 120 may use memory 130 for normal processing functions, e.g., execution of processes, procedure, or the functions of IO process 126 and garbage collector 128 and for storage of metadata 132 that may be required for execution of storage operations. Additionally, memory 130 may store metadata storage records 134 that storage system 100 may use to maintain and access metadata store 154 and any redundant metadata stores 156.

Metadata generally is data that describes data. In storage system 100, metadata 132 may include information about the physical disks or other storage devices in backend media 150. For example, physical disk metadata may include information such as a serial number of a storage drive and the size and last known position of the storage drive. Such physical disk metadata may be created when storage system 100 starts using a new disk, may be modified if the disk has been moved, or may be removed when the disk is no longer in use, e.g., due to being replaced. Metadata 132 may also include volume metadata that provides information about volumes 122 and may cover both base volumes where the data is written and the snapshots taken of the volumes. Volume metadata may particularly include information such as the volume name, size, creation time, a unique identifier used in the IO path, and whether the volume was cleanly shut down. Volume metadata may be created when a user requests adding a new volume 122, may be modified when storage system 100 cleanly shuts down the volume 122 or performs operations on the volume 122 that result in the volume no longer being "clean," and may be removed when the user requests removing the volume. Metadata 132 may additionally include snapshot schedules, where a user has requested that snapshots be made of volumes on a periodic basis, such as once an hour. Snapshot schedules include information such as which volumes 122 storage system 100 needs snapshots and at what times the snapshots should be created. Snapshot schedules may be created when the user requests a new schedule, modified when timing of snapshots is changed, and removed when the user removes an existing schedule. These are just a few notable examples of uses of metadata 132 in storage system 100, but more generally, storage systems may employ metadata for any purposes.

Operation of storage system 100 may cause many frequent changes to metadata 132, and any changes need to quickly be made persistent so that data is not lost when storage system 100 shuts down and powers up again, particularly in the event of an unexpected power loss. Metadata 132 may need to be regularly stored in backend media 150 to avoid the need for memory 130 to include any persistent memory or to save space in memory 130 even if a persistent portion of memory 130 is available. Storage system 100 accordingly provides one or more dedicated metadata store 154 in backend media 150 for metadata storage. Dedicated metadata store 154 may be a raw partition, which is a partition of a hard drive or other storage device in a state or condition that is not formatted for any specific operating or file system. An advantage of using a raw partition is that storage of the metadata is not subject to the overhead or delays required to meet a file system standard so that data may be quickly and reliably appended in metadata store 154 with less risk that power loss or other interruption could occur while writing to metadata store 154.

Additional or redundant metadata stores 156 may be setup and used in the same manner as metadata store 154. For redundancy, any metadata stores 154 and 156 may be in backend media 150 but in different storage devices. In general, the data structures and processes for each redundant metadata stores 156 may be identical to the data structures and processes for metadata store 154.

Figure 2:
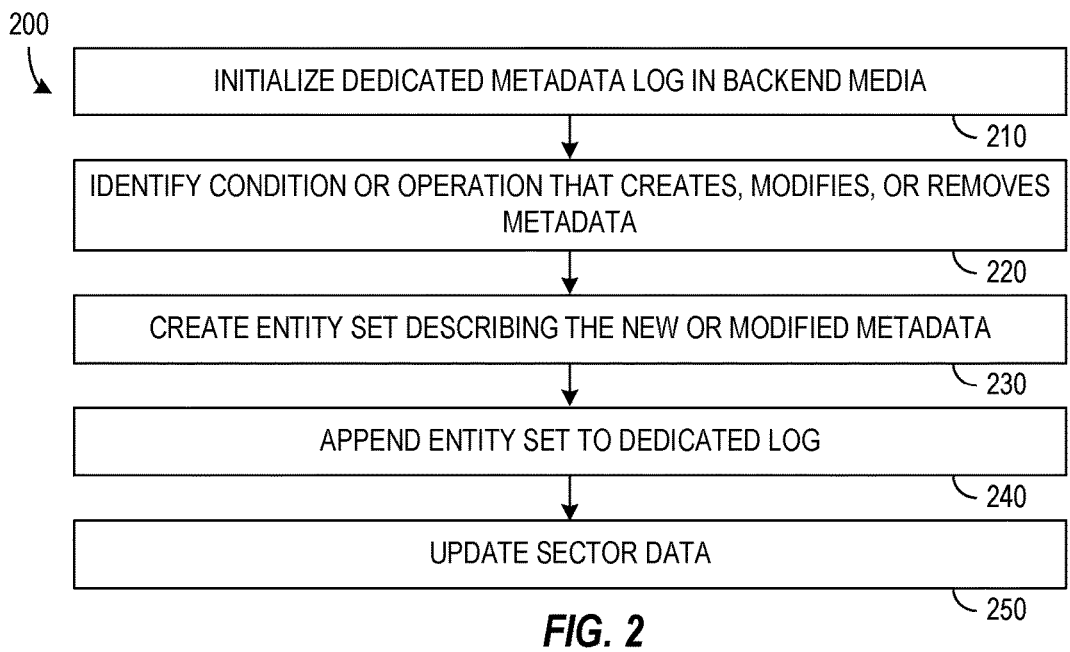
FIG. 2 is a flow diagram of a process in accordance with an example of the present disclosure for persistent storage of storage system metadata.

FIG. 2 is a flow diagram of a process 200 for storage of metadata in a storage system. Process 200 is described herein primarily with reference to storage system 100 of FIG. 1, but process 200 may be applied more generally in most any other storage system that may need to persistently store any type of metadata. A process block 210 sets up or initializes the backend media of the storage system to provide for one or more dedicated metadata store. For example, storage system 100 may set up backend media 150 to include dedicated store 154 for storage of metadata of one, multiple, or all types of metadata that storage system 100 may use. When a new physical metadata store 154 of backend media 150 is initialized, storage system 150 may give the new physical data store 154 a universally unique identifier (UUID) that is unique to the newly created set of metadata to ensure that the contents of two dissimilar data stores will not be accidentally merged. In particular, the UUID of metadata store 154 may facilitate reuse of disks or other storage devices in backend media 150 by distinguishing disks that may contain data that doesn't match up with the current store 154.

Each physical data store 154 is partitioned into sections 158-1 to 158-N, e.g., into sections that are 1 MiB in size, and an ordered sequence 158-1 to 158-N of sections of physical data store 154 form an append log. In particular, writing data to any section 158-*x* of physical data store 154 always either writes additional data on the block immediately after the previous write or marks that block as invalid. A string, e.g., "PASTENTS," or other designator may be written at a position in a section where a block would otherwise start to indicate that although the section or partition may be larger than the current position, this is where the actual in-use area of the section ends. The use of such a designator, e.g., PASTENTS, marks where to stop reading from a section because there is nothing further in use.

Process block 210 also initializes records 134 for the new metadata store. In the example of FIG. 1, when initializing metadata store 154, storage system 100 may particularly initialize an entity record 136 and a section record 138. An entity record 136 may, for example, initially be empty but generally includes entries corresponding to entities with each entry indicating which of sections 158-1 to 158-N stores a currently valid version of the entity. Section record 138 may, for example, include a set of N entries corresponding to sections 158-1 to 158-N of metadata store 154, where each entry in section record 138 indicates whether the corresponding section is used, i.e., stores valid section data, and the number of valid entities stored in the corresponding section. As described further below, storage system 100 may use records 134 for operation, maintenance, and garbage collection in metadata store 154.

The storage system, in a block 220 of process 200, identifies a condition or operation that creates, modifies, or removes metadata. The storage system may, for example, be informed of or identify a change to devices in backend media 150 or may process any operation that otherwise requires the creation, modification, or removal metadata. For example, physical backend media, virtual volumes, or snapshot schedules may be added, modified, or removed requiring creation, modification, or removal of metadata. The identified condition or operation may require addition, change, or removal of different types metadata or metadata associated with different systems. In accordance with an aspect of the present disclosure, metadata is divided into entities, and each identified condition or operation may create, modify, or remove metadata associated with one or more entities. A process block 230 corresponds to a storage system creating an entity set describing the metadata associated with the condition or operation that process block 220 identified.

Figure 3:
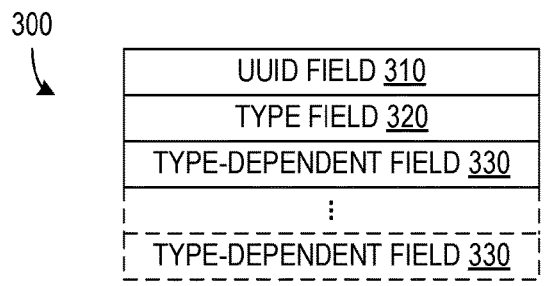
FIG. 3 is a block diagram illustrating a data structure for an entity in an append log storing metadata.

FIG. 3 shows a block diagram of an example data structure for an entity 300. Entity 300 consists of two required fields 310 and 320 plus zero or more type-dependent fields 330. In one specific implementation, each entity is encoded using JavaScript Object Notation (JSON). JSON has the advantage of being a currently well-known standard that is self defining and sufficiently compact after compression.

The first required field 310 in entity 300 is a UUID field that uniquely describes or identifies entity 300. The value in UUID field 310, in storage system 100 for example, may correspond to a virtual volume 122, a snapshot schedule, a particular storage device or portion of a device in backend media 150, or any other entity for which storage system 100 keeps metadata. The addition of an entity with an already-used value in UUID field 310 is treated as completely replacing any prior instance(s) of the entity having the already-used UUID value. The reuse an entity UUID can thus modify metadata, e.g., redefining parameters of a virtual volume, a snapshot schedule, or physical device corresponding to the entity UUID.

The second required field 320 is a type field. When the storage system reads an entity from backend media, the storage system can use the value in type field 320 to recognize how to interpret all other encoded fields 330. For example, type field 320 may identify metadata for a virtual volume, a snapshot schedule, or a physical device. The value of type field 320 may also be changed to TypeDeleted to indicate that an entity 300 is to be deleted. After an update changing a type field 320 of an entity 300 to TypeDeleted, there should be no future references to the UUID of the entity 300, and the metadata associated with the UUID value has effectively been deleted. Zero, one, or multiple type-dependent fields 330 may follow type field 320, and the values of type-dependent fields 330 have meaning that depends on the value in type field 320.

Process block 230 of FIG. 2 creates an entity set that includes one or more entities. An entity set may contain a single entity if the identified condition or operation of process block 220 is an instance of only one type, e.g., is the creation or deletion of a single virtual volume or the addition of a storage device. An entity set may include multiple entities when he identified condition or operation of process block 220 affects multiple storage entities, e.g., replaces one storage device with another or reorders already connected storage devices.

Process block 240 updates metadata store 154 with the entity set created in process block 230. As noted above, the entity set may include multiple entities as a concatenation of JSON representations that are appended together atomically. Process block 240 may include compressing the concatenation of the JSON representations of the entities or their individual lengths using a conventional compression protocol, e.g., zlib. Further, process block 240 may generate and add a header for the entity set. For example, the header for a stored entity set may include the data store UUID, a version number, a monotonically increasing generation number reflecting the temporal order in which the entity set was appended, the length of the compressed entity set, and a checksum for the other values. In process block 240, the storage system writes the header, immediately followed by the compressed entity set, to disk starting at the next available disk block boundary in the dedicated metadata store. If the header and compressed entity set do not fit in the remaining space in the current section of the metadata store, a new section is selected and the header and compressed entity set are written at the start of the new section instead. The new section may simply be the next unused section in the sequence of sections dedicated to the metadata store, wrapping around from the last to the first section in the metadata store if the check attempts to go past the last section.

A process block 250 updates metadata storage records, e.g., records 134 in the example of storage system 100 for metadata 154 store of FIG. 1. A garbage collection process for store 154 may use records 134 to identify metadata that is no longer needed and identify old sections that only store unneeded metadata, sometimes referred to herein as stale metadata. Sections identified as being stale may be marked as unused and eventually released for reuse to prevent eventual exhaustion of available space in store 154. In one specific example illustrated in FIG. 1, entity record 136 records the UUIDs of all entities, and for each entity, entity record 136 indicates which section 158-1 to 158-N of the metadata store 154 contains the most recent modification of the entity. Further, for each section of store 154, section record 138 records the number of entities for which each section contains the most recent update. When section record 138 indicates that the number of entities for which a particular section 158-*x* provides the most recent update is zero, the section 158-*x* is known to have only stale data and may be safely reused. A generation of 0 may be written to the entity set header at the start of a stale section to indicate that the section is no longer in use.

Figure 4:
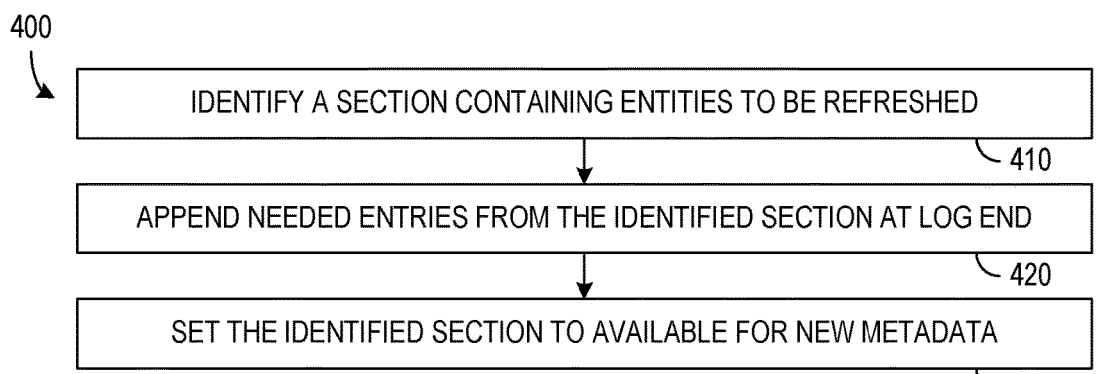
FIG. 4 is a flow diagram of a refresh and garbage collection process for a metadata store in accordance with an example of the present disclosure.

A section containing a single entity or only a few entities that are still needed, e.g., entities that haven't changed for an extended period of time, can prevent the garbage collection process from making the section available for the appending of new entity sets. To prevent inefficient or underutilization of such sections, the storage system can create metadata refreshes, e.g., updates that are not based on new operations or identified conditions, to move the contents of underutilized sections into a current section of the metadata store, thereby allowing the underutilized sections to be actively garbage collected. FIG. 4, for example, illustrates a process 400 for refreshing entities to make an underutilized section of a metadata store available for new entity sets. In process 400, the garbage collection module identifies a section of the metadata store containing entities to be refreshed, e.g., containing fewer than a threshold number of entities that have not be superseded. In a process block 420, one or more entity set for the refresh may be created based on all non-stale entities in the identified section, e.g., using the exact contents of the non-stale entity sets. Any stale entities, e.g., entities that had a type value of "TypeDeleted," are simply dropped, as there is no longer any reference to them. Process block 420 may write the refresh entity set to the metadata store exactly as a normal entity set, e.g., append the refresh entity set at the end of the metadata store as described with reference to process 200 of FIG. 2. On completion, the identified section no longer contains the most recent reference to any entity and can safely be set as available, e.g., have a first entity header marked with a generation of 0, during a process block 430.

A refresh process or garbage collection of the metadata store may be performed periodically or triggered in response to specific events. For example, if the use of a new section of the metadata store means that 80% of the total sections of the metadata store are in use, the section with the largest number of stale entities (or fewest valid entities) may be identified and selected for active garbage collection, e.g., in process block 410 of process 400. This trigger prevents the metadata store from imminently running out of space. Alternatively, process block 410 may identify any section having more than 50% of its entities being stale entities, e.g., a section that is being inefficiently utilized, so that the entities that are not stale may be refreshed, and the section can immediately selected for active garbage collection.

Figure 5:
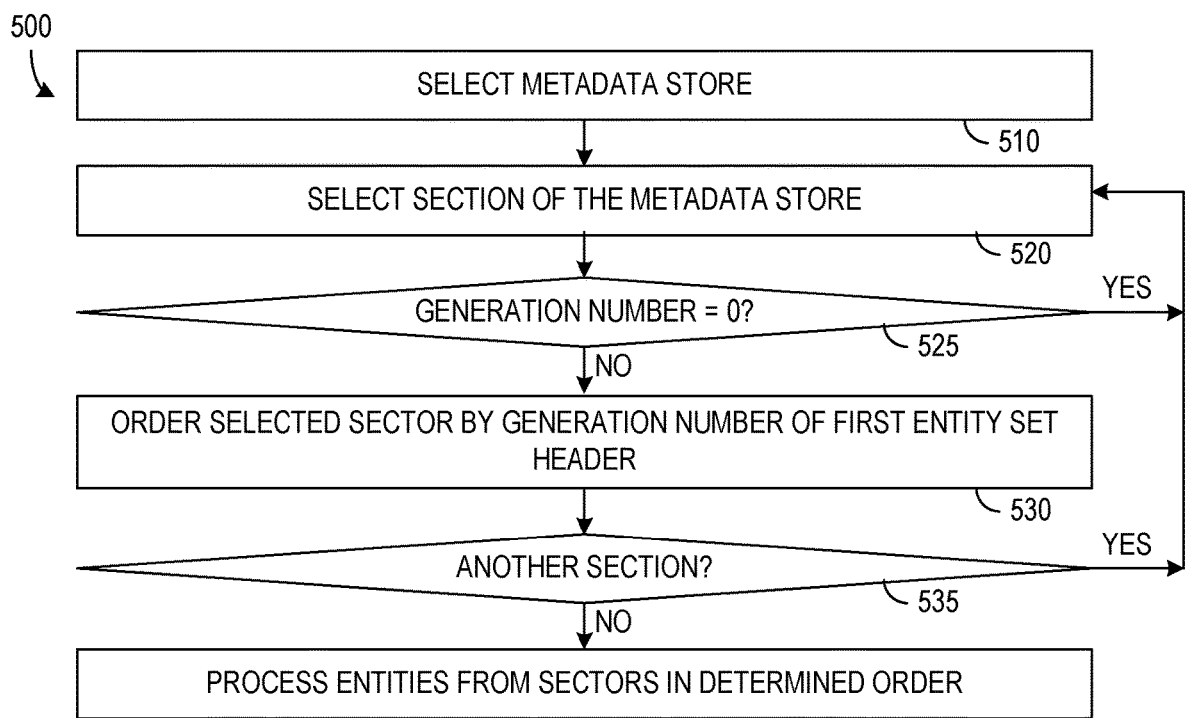
FIG. 5 is a flow diagram of a process for reading from metadata stores in accordance with an example of the present disclosure.

A storage system may access a metadata store when the storage system starts up or recovers from an unexpected loss of power. For example, storage system 100, when starting, may read from a store 154 or 156 to reconstruct metadata 132 using a process 500 illustrated in FIG. 5. A process block 510 of process 500 selects one or more metadata store 154 or 156 to read. For implementations of storage system 100 having only a single metadata store 154, selection process 510 simply identifies the metadata store 154. A process block 520 selects one of sections 158-1 to 158-N to be read from the selected metadata store 154, and a first performance of process block 520 may select a first section 158-1. When reading the metadata from a section, a decision block 525 examines the header of the entity at the start of the selected section. In particular, a section having a generation of 0 in its first entity header is stale and ignored, and process 500 branches from decision block 525 back to process block 520 to select a next section.

A loop including process blocks 520, 525, 530, and 535 orders the non-stale section of the selected metadata store 154 according to the generation numbers of the entities.

Once a decision block 535 determines that an order has been established for all non-stale sections, a process block 540 processes the remaining entities from the sections in order based on the generation number of the first entity set in each section. For each section, the entity sets are examined in order, adding their entities into a map keyed on the UUIDs of the entities. When an entity has been modified multiple times, the UUID of the entity sequentially reappears, so that sequential processing drops the earlier versions.

Checksums in the entity headers may be used for error detection. If the checksum in the header of a compressed entity set does not match the rest of the header or if a decompress process, e.g., zlib, used to decompressed the entity set reports corrupt data, the metadata code crashed while writing, and parsing of the entity set stops there. Once all entity sets have been examined, the map may be trimmed of entities with the TypeDeleted type, and the map is returned to the code, e.g., the recovery procedure, requesting the read of metadata.

The above processes may be extended to storage platforms that use multiple metadata stores for redundancy. For this case, a count of expected total data stores 154 and 156 may be included in the entity set header. In this case, before reading metadata, process block 510 of process 500 can scan each metadata store 154 and 156 for the section starting with the highest generation number, and the entity set header from the final entity set is retained. If the entity set header's metadata UUID is not identical on all of the data stores, the data stores are grouped by this UUID and each group looked at separately. Process block 510 may select the entity set header with the largest generation in a group to be the only store 154 or 156 parsed. If the number of data stores 154 and 156 with the same metadata UUID is greater than half of the total number of data stores recorded, the entity set header being considered is valid so long as any writes were to at least half of the data stores. If a write failed at least half of the data stores, the metadata code must either block until some are restored or panic the code requesting the update.

Each of modules described herein may include, for example, hardware devices including electronic circuitry for implementing the functionality described herein. In addition or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A process for storing metadata for a storage system, comprising:
    partitioning a data storage device into a plurality sections that are initially unused and are dedicated to an append log for metadata;
    splitting first metadata into a first set of entities;
    encoding the first set of entities as encoded entities suitable for the append log;
    storing the encoded entities in the append log beginning at a first of the sections so that the first section used;
    splitting following metadata into a next set of entities;
    encoding the next set of entities as next encoded entities suitable for the append log; and
    storing the next set of encoded entities in the append log following a prior end of the append log.

2. The process of claim 1, further comprising:
    detecting one of the sections that is used and contains only stale entities; and
    designating the detected section as being unused.

3. The process of claim 2, further comprising:
    monitoring numbers of entities that are not stale in a targeted one of the sections; and
    in response to the number falling below a limit, storing the entities that are not stale from the target section at the end of the append log so that all of the entities in the target section are stale.

4. The process of claim 1, further comprising:
    monitoring numbers of entities that are not stale in a targeted one of the sections; and
    in response to the number falling below a limit, storing the entities that are not stale from the target section at the end of the append log so that all of the entities in the target section are stale.

5. The process of claim 1, wherein the append log corresponds to a raw partition of the storage device.

6. The process of claim 1, further comprising a plurality of repetitions of:
    splitting following metadata into a next set of entities;
    encoding the next set of entities as next encoded entities suitable for the append log; and
    storing the next set of encoded entities in the append log following a prior end of the append log.

7. The process of claim 1, wherein the encoding comprises encoding using JavaScript Object Notation (JSON).

8. A storage processing system configured to control a data storage device and further configured to perform a process including:
    partitioning the data storage device into a plurality sections that are initially unused and are dedicated to an append log for metadata that the storage processing system uses;
    identifying a condition or operation that affects the metadata that the storage processing system uses;
    encoding the affected metadata as a first set of entities suitable for the append log;
    storing the encoded entities in the append log beginning at a first of the sections so that the first section used;
    identifying a next condition or operation that affects the metadata that the storage processing system uses;
    encoding the metadata affected by the next condition or operation as a next set of entities suitable for the append log; and
    storing the next set of encoded entities in the append log following a prior end of the append log.

9. The storage processing system of claim 8, further comprising one or more repetitions of:
    identifying a next condition or operation that affects the metadata that the storage processing system uses;
    encoding the metadata affected by the next condition or operation as a next set of entities suitable for the append log; and storing the next set of encoded entities in the append log following a prior end of the append log.

\* \* \* \* \*